(12) United States Patent
Aziz et al.

(10) Patent No.: US 11,305,995 B2
(45) Date of Patent: Apr. 19, 2022

(54) METHOD OF PREPARING CARBON PARTICLES FROM OIL ASH

(71) Applicant: KING FAHD UNIVERSITY OF PETROLEUM AND MINERALS, Dhahran (SA)

(72) Inventors: Md. Abdul Aziz, Dhahran (SA); Shaik Inayath Basha, Dhahran (SA); Abbas Saeed Hakeem, Dhahran (SA); Mohammed Maslehuddin, Dhahran (SA); Shamsad Ahmad, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 249 days.

(21) Appl. No.: 16/812,798

(22) Filed: Mar. 9, 2020

(65) Prior Publication Data

US 2021/0276870 A1    Sep. 9, 2021

(51) Int. Cl.
| | | |
|---|---|---|
| *C01B 31/02* | (2006.01) | |
| *C01B 32/05* | (2017.01) | |
| *C10B 53/00* | (2006.01) | |
| *C10B 57/00* | (2006.01) | |

(52) U.S. Cl.
CPC ............ *C01B 32/05* (2017.08); *C10B 53/00* (2013.01); *C10B 57/005* (2013.01); *C01P 2002/82* (2013.01); *C01P 2002/85* (2013.01); *C01P 2004/62* (2013.01)

(58) Field of Classification Search
CPC .............................. C01B 32/05; C01B 57/005
See application file for complete search history.

(56) References Cited

FOREIGN PATENT DOCUMENTS

| | | |
|---|---|---|
| CN | 1817456 A | 8/2006 |
| CN | 108342213 B | 11/2019 |
| JP | 2005-336442 A | 12/2005 |
| WO | WO 2004/083119 A1 | 9/2004 |

OTHER PUBLICATIONS

A.A. Arie, et al., "Synthesis of Carbon Nano Materials Originated from Waste Cooking Oil Using a Nebulized Spray Pyrolysis", International Conference on Energy Sciences (ICES), IOP Conference Series: Journal of Physics: Conference Series, vol. 877, No. 012020, 2017, pp. 1-6.

Weerawut Chaiwat, et al., "Synthesis of Carbon Nanoparticles via Co-pyrolysis of Waste Slop Oil and Ferrocene", Advanced Materials Research, vol. 1103, 2015, pp. 97-103.

Reza Hendriansyah, et al., "Nano Carbon Materials from Palm Oil Wastes for Supercapacitor Applications", 4th International Conference on Electric Vehicular Technology (ICEVT), Oct. 2-5, 2017, pp. 13-18.

Suranjana V. Mayani, et al., "Synthesis and characterization of metal incorporated composite carbon materials from pyrolysis fuel oil", Materials Letters, vol. 82, Sep. 2012, pp. 120-123 (Abstract only).

Md. Abdul Aziz, et al., "Highly porous carboxylated activated carbon from jute stick for removal of $Pb^{2+}$ from aqueous solution", Environmental Science and Pollution Research, vol. 26, 2019, pp. 22656-22669.

Leila Shahriary, et al., "Graphene Oxide Synthesized by using Modified Hummers Approach", International Journal of Renewable Energy and Environmental Engineering, vol. 02, No. 01, Jan. 2014, pp. 58-63.

Khurshed A. Shah, et al., "Synthesis of carbon nanotubes by catalytic chemical vapour deposition: A review on carbon sources, catalysts and substrates", Materials Science in Semiconductor Processing, vol. 41, 2016, pp. 67-82.

Haegyeom Kim, et al., "Scalable Functionalized Graphene Nanoplatelets as Tunable Cathodes for High-performance Lithium Rechargeable Batteries", Scientific Reports, vol. 3, No. 1506, Mar. 21, 2013, pp. 1-8.

*Primary Examiner* — Stuart L Hendrickson
(74) *Attorney, Agent, or Firm* — Oblon, McClelland, Maier & Neustadt, L.L.P.

(57) ABSTRACT

A method of producing submicron carbon particles from oil ash. The method comprises pyrolyzing the oil ash to produce a pyrolyzed oil ash and milling the pyrolyzed oil ash to produce carbon particles having a mean particle size in the submicron regime. The method produces submicron carbon particles which have a very high carbon content (90 to 99 atom %) and a very low content of oxygen, the particles having a ratio of carbon to oxygen ratio of 10:1 to 99:1. The size of the particles may be controlled by the duration of the milling. The submicron carbon particles are devoid of functionalities containing carbon-oxygen double bonds as measured by Raman spectroscopy and X-ray photoelectron spectroscopy (XPS).

20 Claims, 6 Drawing Sheets

METHOD OF PREPARING CARBON PARTICLES FROM OIL ASH

BACKGROUND OF THE INVENTION

Technical Field

The present invention relates to a method of preparing submicron carbon particles from oil ash.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Micron, submicron, and nanostructured carbon has found use in a wide variety of applications, such as consumer electronics [L.-M. Peng, et. al., Materials Today, 17 (2014)], solar cells [D. H. Kweon, and J.-B. Baek, Advanced Materials, 31 (2019)], fuel cells [J. Liu, et. al., Energy Science and Engineering, 5 (2017) 217-225; and S. Celebi, Eindhoven: Technische Universiteit Eindhoven, (2012) DOI: 10.6100/IR734616], electrochemical sensors [A. J. S. Ahammad, et. al., Journal of Electroanalytical Chemistry, 832 (2019) 368-379; and A. J. S. Ahammad, et. al., Nanoscale Advances, 1 (2019) 613-626], drug delivery [T. Kong, et. al., Cell Proliferation, 51, 5, (2018)], enhanced oil recovery [Dan Luo, F. et. al., PNAS, 113 (2016) 7711-7716], paints and other surface coatings [L. Chen, et. al., Coatings, 7 (2017); M. M. Rahman, et. al., Korean J. Chem. Eng., 34 (2017) 2480-2487; and M. M. Rahman, et. al., Coatings, 8 (2018)], construction materials [M. A Kewalramani, and Z. I. Syed, International Journal of Integrated Engineering, Special Issue 2018: Civil & Environmental Engineering, 10 (2018) 98-104; C. Ming-li, et. al., J. Cent. South Univ., 23 (2016) 919-925; and Z. Pan, et. al., Cement & Concrete Composites, 58 (2015) 140-147], and environmental pollutant removal [M. A. Aziz, et. al., Environmental Science and Pollution Research, 26 (2019) 22656-22669]. The applications come from advantages imparted by high surface area and unique mechanical, chemical, and electrical properties.

When such submicron and nanostructured carbon particles are conductive, these materials have advantages over larger sized carbon particles in various fields including electrochemical applications, conductive coatings for applications in the construction industry such as anticorrosion coatings and cathodic protection coatings [M.-A. Climent, et. al., Coatings, 6 (2016)], manufacturing of conductive concrete [C. Andrade, et. al., Electronic and Electrolytic Conduction of Cement Pastes with Additions of Carbonaceous Materials, Durability of Reinforced Concrete from Composition to Protection (2015) Springer International Publishing Switzerland] which helps in de-freezing the ice on concrete in cold areas [S. A. Yehia, and C. Y. Tuan, Transportation Research Record 1698, Paper No. 00-0117, University of Nebraska-Lincoln, Department of Civil Engineering, Peter Kiewit Institute, 1110 South 67th Street, Omaha, Nebr. 68182-0178], and electromagnetic shielding material [A. P. Krause, et. al., Civil Engineering Faculty Publications, (2013) Paper 7].

Conventional methods for the preparation of small sized particles including submicron/nanoparticles of carbon materials, such as graphene and graphene oxide [L. Shahriary, and A. A. Athawale, International Journal of Renewable Energy and Environmental Engineering, 02 (2014) 58-63], carbon nanotubes [K. A. Shah, and B., Materials Science in Semiconductor Processing, 41 (2016) 67-82], carbon nanoplatelets [H. Kim, et. al., Scientific Reports, 3 (2013)], and fullerenes rely on bottom-up processes that transform various precursors to these carbon materials through tightly controlled reactions. However, the production cost of these conventional methods for producing small sized carbon particles is very high due to factors such as complex and expensive infrastructure, limited batch sizes, the requirement of expensive or sensitive catalysts, and costly sources of the carbon like glucose or expensive fuels. In contrast to these methods, one avenue of research into these carbon materials is preparation processes using inexpensive sources, such as biomass or industrial waste materials.

Oil ash is an industrial waste material with few known uses. It is a byproduct of power generation from the electrical companies using oil or heavy oil in power plants, such as various companies in Saudi Arabia. Oil ash contains particles having a spherical shape. These spherical particles have macropores or voids and are typically very carbon-rich, being composed of approximately 83% carbon by weight. Oil ash also contains hydrocarbon and oxygen containing carbon compounds that arise from the incomplete combustion of rich-carbon materials.

Such industrial waste or biomass materials, however, are not suitable precursors or carbon sources for conventional methods of generating submicron/nanoparticles of carbon materials.

In view of the foregoing, one objective of the present invention is to provide a method for the preparation of submicron carbon particles from oil ash, which may be a byproduct of power generation, the method involving pyrolysis and milling.

BRIEF SUMMARY OF THE INVENTION

According to a first aspect, the present disclosure relates to a method for producing submicron carbon particles comprising pyrolyzing oil ash at 600 to 1000° C. for 1 to 6 hours to produce a pyrolyzed oil ash, and milling the pyrolyzed oil ash for 1 to 24 hours to produce the submicron carbon particles, wherein the submicron carbon particles have a ratio of carbon to oxygen of 10:1 to 99:1, and wherein the submicron carbon particles are devoid of functional groups containing carbon-oxygen double bonds as determined by XPS or Raman spectroscopy.

In some embodiments, the oil ash comprises carbon, oxygen, and sulfur.

In some embodiments, the oil ash has a carbon to oxygen ratio of 3:1 to 15:1.

In some embodiments, the oil ash further comprises at least one element selected from the group consisting of vanadium, iron, aluminum, silicon, magnesium, and calcium.

In some embodiments, the oil ash has a carbon atomic % of 65 to 89 atom % based on a total number of atoms in the oil ash.

In some embodiments, the oil ash has a sulfur atomic % of less than 2 atom % based on a total number of atoms in the oil ash.

In some embodiments, the oil ash is a heavy oil ash.

In some embodiments, the pyrolyzing is performed with a heating rate of 1° C./min to 15° C./min and a cooling rate of 1° C./min to 15° C./min.

In some embodiments, the pyrolyzing is performed in an inert atmosphere.

In some embodiments, the milling is ball milling.

In some embodiments, the ball milling is performed at 1500 to 5000 rpm and with a ball-to-powder ratio of 50:1 to 5:1 by mass.

In some embodiments, the submicron carbon particles have a carbon atomic % of 90 to 99 atom % based on a total number of atoms in the submicron carbon particles.

In some embodiments, wherein the submicron carbon particles have a sulfur atomic % of less than 5 atom % based on a total number of atoms in the submicron carbon particles.

In some embodiments, the submicron carbon particles further comprise at least one element selected from the group consisting of vanadium, iron, aluminum, silicon, magnesium, and calcium.

In some embodiments, the submicron carbon particles have a mean particle size of 100 to 500 nm.

In some embodiments, the pyrolyzed oil ash is milled for 1 to 7.5 hours and the submicron carbon particles have a mean particle size of 350 to 500 nm.

In some embodiments, the pyrolyzed oil ash is milled for 7.5 to 12.5 hours and the submicron carbon particles have a mean particle size of 200 to 350 nm.

In some embodiments, the pyrolyzed oil ash is milled for 12.5 to 24 hours and the submicron carbon particles have a mean particle size of 100 to 200 nm.

In some embodiments, the submicron carbon particles have a Raman spectrum that has a ratio of an intensity at 1520 to 1590 $cm^{-1}$ to an intensity at 1275 to 1325 $cm^{-1}$ of 1:1 to 3:1.

In some embodiments, the submicron carbon particles have an XPS spectrum with a single signal in the region 280 to 292 eV with a maximum intensity at 283.5 to 285.5 eV.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1A-1F are SEM and EDS spectra of the oil ash before and after pyrolysis, wherein FIGS. 1A and 1B are SEM images of the oil ash, FIG. 1C is an EDS spectrum of the oil ash, FIGS. 1D and 1E are SEM images of pyrolyzed oil ash, and FIG. 1F is an EDS spectrum of the pyrolyzed oil ash;

FIG. 2A-2B are SEM images of the pyrolyzed oil ash, wherein FIG. 2A is a low magnification SEM image and FIG. 2B is a high magnification SEM image;

FIG. 3A-3D are X-ray Photoelectron Spectroscopy (XPS) spectra of the materials, wherein FIGS. 3A and 3B are the XPS spectra of oil ash before pyrolysis with FIG. 3A representing the full spectrum from 0 to ~1100 eV and FIG. 3B showing the C1s portion of the spectrum from 280 to 292 eV, and FIGS. 3C and 3D are XPS spectra of pyrolyzed oil ash with FIG. 3C representing the full spectrum from 0 to ~1100 eV and FIG. 3D showing the C1s portion of the spectrum from 280 to 292 eV;

FIG. 4A-4F are SEM images of the submicron carbon particles at different ball milling durations at two different magnification levels, wherein FIGS. 4A and 4B are submicron carbon particles obtained after 5 hours of ball milling with FIG. 4A being a lower magnification SEM image and FIG. 4B being a higher magnification SEM image, FIGS. 4C and 4D are submicron carbon particles obtained after 10 hours of ball milling with FIG. 4C being a lower magnification SEM image and FIG. 4D being a higher magnification SEM image, FIGS. 4E and 4F are submicron carbon particles obtained after 15 hours of ball milling with FIG. 4E being a lower magnification SEM image and FIG. 4F being a higher magnification SEM image;

FIG. 6A-6C are Raman spectra in the region of 1800 cm-1 to 1200 cm-1 displaying the G-band and D-band of the materials, wherein FIG. 6A is the spectra for the oil ash before pyrolysis, FIG. 6B is the spectra for the pyrolyzed oil ash, and FIG. 6C is the spectra for the submicron carbon particles.

DETAILED DESCRIPTION OF THE INVENTION

Figure 1A:
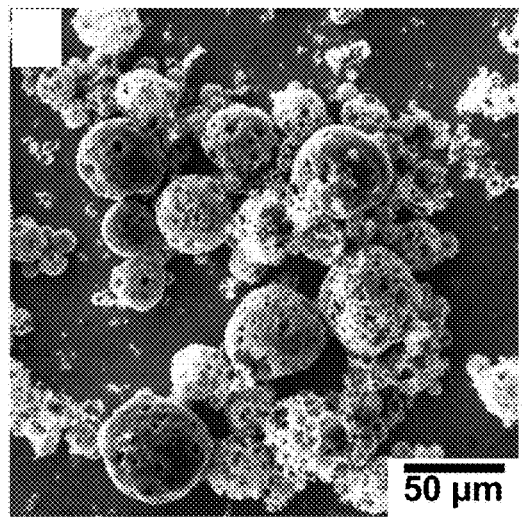

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "pyrolysis" refers to a chemical decomposition caused by heat (known as thermal decomposition or thermolysis) applied specifically to a carbon-containing material. Pyrolysis is typically performed in an atmosphere with a limited supply of oxygen. While not necessary, certain types of pyrolysis are performed in an atmosphere devoid of oxygen. Generally, pyrolysis leaves a solid residue enriched in carbon. "Carbonization" is a related term, but is less general than pyrolysis. Carbonization may refer to a specific type of pyrolysis in which biomass is converted to a material that is "mostly" carbon, i.e., the material comprises greater than about 51 wt % carbon. "Pyrolyzing" refers to a process that subjects a material to pyrolysis.

According to a first aspect, the present disclosure relates to a method for producing submicron carbon particles. The method comprises pyrolyzing oil ash and milling the oil ash to produce the submicron carbon particles.

As used herein, "oil ash" refers to a solid residue formed from the combustion, oxidation, or pyrolysis of a liquid petroleum such as oil. Oil ash is commonly produced in power plants which generate power from the combustion of oil or other petroleum product. Oil ash is typically considered an undesirable byproduct of energy generation or other use of oil or other liquid petroleum. In some embodiments, the oil ash comprises carbon, oxygen, and sulfur. In some embodiments, the oil ash further comprises nitrogen. In some embodiments, the oil ash is substantially free of nitrogen. In some embodiments, the oil ash further comprises at least one element selected from the group consisting of vanadium, iron, aluminum, silicon, magnesium, and calcium. Such elements are commonly present in small amounts in oil or other liquid petroleum used in the production of energy or other use that results in the formation of oil ash, and, thus are derived from the oil or other liquid petroleum from which the oil ash itself is derived. Such elements may be the result of dissolution, exfoliation, or other process of one or more portions of equipment used in the process that generates the oil ash or that contacts the oil.

The oil or liquid petroleum may be crude oil or a petroleum distillate or distillation residue. "Heavy oil" or "heavy crude oil" is a type of crude oil characterized by an API gravity of between 22° to and 10°. While not a strict requirement for the definition, heavy oil typically has a viscosity of greater than 10 cP. Heavy oil also typically has a low kinematic velocity and high solidification point. It is distinct from "extra-heavy oil", which has an API gravity of less than 10°. Heavy oil may contain high levels of asphaltenes and/or petroleum resins. Asphaltenes are molecular substances consisting primarily of carbon, hydrogen, nitrogen, oxygen, and sulfur and typically have molecular masses from 400 to 1500 Da. Petroleum resins are thermoplastic hydrocarbon resins having molecular masses from 500 to 5000 Da. Examples of petroleum distillates or distillation residues include gasoline (also called petrol), jet fuel, kerosene, diesel fuel, and fuel oil. Most commonly, oil ash is formed from fuel oil. Fuel oil, also known as heavy oil, marine fuel, or furnace oil, is commonly split into two general classifications, distillate fuel oil which is produced as a petroleum distillate and residual fuel oil which is produced as a petroleum distillation residue. Commonly, residual fuel oil is used for power generation applications that give rise to large quantities of oil ash. Fuel oil may be classified by various properties including specific gravity, flash point, pour point, and kinematic viscosity. One classification scheme commonly used in the United States is defined by the American Society for Testing and Materials (ASTM) and is provided in ASTM D396. This scheme classifies fuel oils into 7 grades: No. 1, No. 2, No. 4 (light), No. 4 (heavy), No. 5 (light), No. 5 (heavy), and No. 6. Typically, No. 1, No. 2, and No. 4 (light) are petroleum distillates or distillate blends with no distillation residues while No. 4 (heavy), No. 5 (light), No. 5 (heavy), and No. 6 are distillation residues or distillate blends with distillate residues. Commonly, No. 4 (heavy), No. 5 (light), No. 5 (heavy), and No. 6 are considered "heavy fuel oils" and are not used in domestic burners. These heavy fuel oils are frequently used in commercial power generation facilities which are equipped with equipment to store, handle, and burn heavy fuel oils, such as preheaters, heated storage tanks, heated transportation lines, and burners equipped to atomize high viscosity oils. Ash produced from the combustion, whether complete or incomplete, of heavy oil or heavy fuel oil is known as heavy oil ash. In some embodiments, the oil ash is a heavy oil ash. In some embodiments, the heavy oil ash is produced as a byproduct of power generation.

While there may be a number of elements present in the oil ash, the primary constituent of oil ash, similar to other types of ash, is carbon. In some embodiments, the oil ash has a carbon atomic % of 65 to 89 atom %, preferably 70 to 88 atom %, preferably 72 to 87.5 atom %, preferably 75 to 87 atom %, preferably 77.5 to 86 atom %, preferably 80 to 85 atom %, preferably 82 to 84.5 atom %, preferably 83 to 84 atom % based on a total number of atoms in the oil ash.

In some embodiments, the oil ash has a carbon to oxygen ratio of 3:1 to 15:1, preferably 3.25:1 to 12.5:1, preferably 3.5:1 to 10:1, preferably 3.75:1 to 9:1, preferably 4:1 to 8:1, preferably 4.25:1 to 7.5:1, preferably 4.5:1 to 7:1, preferably 4.75:1 to 6.5:1, preferably 5:1 to 6:1, preferably 5.5:1 to 5.75:1. In some embodiments, the oil ash has an oxygen atomic % of 4.5 to 30 atom %, preferably 5 to 25 atom %, preferably 7.5 to 22.5 atom %, preferably 10 to 20 atom %, preferably 12.5 to 17.5 atom %, preferably 13 to 17 atom %, preferably 14 to 15 atom % based on a total number of atoms in the oil ash. In some embodiments, the oil ash has a sulfur atomic % of less than 2 atom %, preferably less than 1.975 atom %, preferably less than 1.95 atom %, preferably less than 1.925 atom %, preferably less than 1.90 atom %, preferably less than 1.875 atom %, preferably less than 1.85 atom %, preferably less than 1.825 atom %, preferably less than 1.8 atom % based on a total number of atoms in the oil ash.

Petroleum power plants typically produce two or more distinct types of ash. Two of the most well-known types of ash are "fly" type ashes and "bottom" type ashes. Combustion of a single material may produce one or both types of ash. Fly type ashes are ashes that are carried, borne, blown, driven or otherwise released from a material being combusted or oxidized by hot gases also released by the material. Fly type ashes typically must be trapped, sequestered, or otherwise removed from the exhaust or other gases generated by the combustion or oxidation of the material. Fly type ashes that are not trapped, sequester, or otherwise removed may be released into the atmosphere. It is worth noting that the term "fly ash" may refer to any fly type ash or may refer specifically to fly type ashes produced by the combustion of coal. The latter may also be referred to as "flue ash", "pulverized fuel ash", and/or "coal fly ash". Such fly type ashes produced by coal are composed primarily (i.e. greater than 51% by mass or by atom %) of inorganic, carbon-free oxide materials such as silica, alumina, iron oxide, and calcium oxide. Coal fly ash, and thus is chemically distinct from the oil ash used in the method of the present disclosure and is generally not suitable for use with said method. Additionally, coal fly ash is produced from coal, which is not an oil or other liquid petroleum, and is thus further distinguished from the oil ash used in the method of the current invention. In some embodiments, the oil ash is an oil fly ash. Oil fly ash may also be referred to as "heavy oil fly ash" and/or "residual oil fly ash". In alternative embodiments, the oil ash is an oil bottom ash. Bottom type ashes are ashes that are formed from the combustion or oxidation of a material that remain in the chamber or area where the combustion or oxidation occurred. Unlike fly type ashes, bottom type ashes are not blown out of the chamber or area by exhaust, flue, or other gases. Bottom type ashes may have similar compositions to fly ashes or may have distinct compositions from fly ashes. The composition of bottom ashes may be similar to or distinct from fly ashes when produced by a single fuel source. In situations where the composition of a bottom ash is similar to its corresponding fly ash (i.e. the fly ash produced from the same fuel source), fly ash and bottom ash may have similar or distinct particle sizes, surface area, porosity, or other physical characteristic that may be used to distinguish these types in addition to the location from which the ash is collected. In some embodiments, the oil ash is an oil bottom ash. In alternative embodiments, the oil ash is a mixture of oil fly ash and oil bottom ash.

In some embodiments, the oil ash exists as particles. In some embodiments, the oil ash particles have a mean particle size of 5 to 50 µm, preferably 12.5 to 45 µm, preferably 15 to 40 µm, preferably 17.5 to 35 µm, preferably 20 to 30 µm, preferably 22.5 to 27.5 µm, preferably about 25 µm. In some embodiments, the oil ash particles may have a spherical shape, or may be shaped like cylinders, boxes, blocks, spikes, flakes, plates, ellipsoids, toroids, stars, ribbons, discs, rods, granules, prisms, cones, platelets, sheets, angular chunks, terraced cubes, terraced rectangular prisms, or some other shape. In some embodiments, the oil ash particles may be substantially spherical, meaning that the distance from the particle centroid (center of mass) to anywhere on the particle outer surface varies by less than 30%, preferably by less than 20%, more preferably by less than 10% of the average distance. In some embodiments, the oil ash particles are in the form of blocks, granules, terraced rectangular prisms, or angular chunks, having a mean size in a range as previously described and having a largest dimension that is 50 to 500%, preferably 75 to 400, preferably 100 to 350%, preferably 150 to 250% of the range previously described and a smallest dimension that is 5 to 150, preferably 10 to 125, preferably 15 to 100, preferably 25 to 75% of the range previously described. In some embodiments, the oil ash particles may be in the form of agglomerates. As used herein, the term "agglomerates" refers to a clustered particulate composition comprising primary particles, the primary particles being aggregated together in such a way so as to form clusters thereof, at least 50 volume percent of the clusters having a mean size that is at least 2 times the mean size of the primary particles, and preferably at least 90 volume percent of the clusters having a mean size that is at least 5 times the mean diameter of the primary particles. The primary particles may be the oil ash particles having a mean size as previously described. In some embodiments, the oil ash particles are monodisperse, having a coefficient of variation or relative standard deviation, expressed as a percentage and defined as the ratio of the particle size standard deviation (σ) to the particle size mean (µ), multiplied by 100%, of less than 25%, preferably less than 10%, preferably less than 8%, preferably less than 6%, preferably less than 5%. In a preferred embodiment, the oil ash particles are monodisperse, having a particle size distribution ranging from 80% of the mean particle size to 120% of the average particle size, preferably 85 to 115%, preferably 90 to 110% of the mean particle size. In another embodiment, the oil ash particles are not monodisperse.

In some embodiments, the oil ash particles are porous. In some embodiments, the oil ash particles have pores the opening of which are substantially circular in shape, meaning that the distance from the pore opening centroid to anywhere on the pore opening edge varies by less than 30%, preferably by less than 20%, more preferably by less than 10% of the average distance. In some embodiments, the oil ash particles have pores having a mean pore size of 1 to 10 µm, preferably 1.5 to 7.5 µm, preferably 2 to 6 µm, preferably 2.5 to 5.5 µm, preferably 3 to 5 µm.

Oil ash may contain soot. As used herein, "soot" refers to a collection of particles consisting essentially of impure carbon. The impurities may be, for example, oxygen, nitrogen, sulfur, hydrogen, silicon or metals such as iron, aluminum, titanium, and cobalt. The particles may additionally have material derived from non-combusted or partially combusted hydrocarbons such as polycyclic aromatic hydrocarbons, alkynes such as acetylene or methylacetylene, phenols, and carboxylic acids. A portion of the carbon present in the oil ash may be present as soot. In some embodiments, a portion of the carbon content of the oil ash is soot. In alternative embodiments, the oil ash is substantially free of soot.

In some embodiments, the pyrolyzing is performed at a temperature of 600 to 1000° C., preferably 625 to 925° C., preferably 650 to 950° C., preferably 675 to 925° C., preferably 700 to 900° C., preferably 725 to 875° C., preferably 750 to 850° C., preferably 760 to 840° C., preferably 770 to 830° C., preferably 780 to 820° C., preferably 790 to 810° C., preferably about 800° C. In some embodiments, the pyrolyzing is performed for 1 to 6 hours, preferably 1.25 to 5.75 hours, preferably 1.5 to 5.5 hours, preferably 1.75 to 5.25 hours, preferably 2 to 5 hours, preferably 2.25 to 4.75 hours, preferably 2.5 to 4.5 hours, preferably 2.75 to 4.25 hours, preferably about 3 hours. In some embodiments, the pyrolyzing is performed with a heating rate of 1° C./min to 15° C./min, preferably 2.5 to 14° C./min, preferably 5 to 13° C./min, preferably 7.5 to 12° C./min, preferably 8 to 11.5° C./min, preferably 9 to 11° C./min, preferably 9.5 to 10.5° C./min, preferably about 10° C./min. In some embodiments, the pyrolyzing is performed with a cooling rate of cooling rate of 1° C./min to 15° C./min, preferably 2 to 12.5° C./min, preferably 2.5 to 10° C./min, preferably 3 to 7.5° C./min, preferably 3.5 to 7° C./min, preferably 4 to 6° C./min, preferably 4.5 to 5.5° C./min, preferably about 5° C./min.

The pyrolyzing may be performed with any suitable equipment known to those of ordinary skill in the art. Examples of such equipment include, but are not limited to retort kilns, electric kilns, Feller kilns, microwave kilns, rotary kilns, autoclaves, tube furnaces, box furnaces, electric arc furnaces, vacuum furnaces, and inert-atmosphere furnaces. In some embodiments, the pyrolysis is performed with a furnace. Examples of furnaces include those furnaces mentioned above. In some embodiments, the oil ash is placed directly in the furnace. In alternative embodiments, the oil ash is placed in a separate container in the furnace. The separate container may be made of a suitable material known to those of ordinary skill in the art. Examples of material suitable for the separate container include quartz, borosilicate glass, ceramics such as boron nitride, silicon carbide, and alumina, graphite, and tantalum.

In some embodiments, the pyrolyzing is performed in ambient atmosphere. In some embodiments, the pyrolyzing is performed in an inert atmosphere. In some embodiments, the inert atmosphere is provided by inert gas such as argon gas, helium gas, or nitrogen gas. In some embodiments, the pyrolyzing is performed under vacuum. In some embodiments, the pyrolyzing is performed in a sealed container made of a suitable material known to those of ordinary skill in the art as described above. In some embodiments, the pyrolyzing is performed with a flow of air or inert gas through the equipment or separate container. In preferred embodiments, the pyrolyzing is performed under dry nitrogen gas.

The method next involves milling the pyrolyzed oil ash to produce the submicron carbon particles. In some embodiments, the milling is performed for 1 to 24 hours, preferably 1.5 to 22 hours, preferably 2 to 20 hours, preferably 2.5 to 19 hours, preferably 3 to 18 hours, preferably 3.5 to 17 hours, preferably 4 to 16 hours, preferably 4.5 to 15.5 hours, preferably 5 to 15 hours. The milling may be performed by a technique such as milling, grinding, ball milling, chopping, pulverizing, crushing, pounding, mincing, shredding, smashing, fragmenting, or another technique that may be used to reduce a material to small particles. In some embodiments, the milling may take place using a mill, ball mill, rod mill, autogenous mill, semi-autogenous grinding mill, pebble mill, burrstone mill, burr mill, tower mill, vertical shaft impactor mill, a low energy milling machine, grinder, pulverizers, mortar and pestle, blender, crusher, or other implement used to reduce a material to small particles. In some embodiments, the milling is ball milling. In some embodiments, the ball milling takes place in a high-energy ball mill. Non-limiting examples of milling media (i.e. bowl and balls) include zirconium dioxide, tungsten carbide, silicon nitride, and alumina. In one embodiment, zirconium dioxide milling media is employed to minimize contamination of the submicron carbon particles. The balls used for milling may have a diameter of 100 to 1,000 preferably 200 to 900 preferably 300 to 800 preferably 400 to 750 µm, preferably 500 to 700 µm, preferably 550 to 650 µm, preferably 600 though balls with diameters smaller than 100 or greater than 1,000 may also be used. In one embodiment, the ball milling is performed with a ball-to-powder (the pyrolyzed oil ash) ratio of 50:1 to 5:1 by mass, preferably 40:1 to 10:1, preferably 30:1 to 15:1, preferably 25:1 to 17.5:1, preferably 22.5:1 to 19:1, preferably 20:1. In some embodiments, the milling is performed in an inert atmosphere, preferably provided by inert gas such as argon gas, though in another embodiment, the milling may be performed in air. In some embodiments, the milling is performed at ambient temperature (i.e. 23 to 26° C.). A high-energy ball milling apparatus may use a rotation rate of 100 to 10,000 rpm, preferably 500 to 7,500 rpm, preferably 1,000 to 5,000 rpm, preferably 1,500 to 4,500 rpm, preferably 2,000 to 4,000 rpm, preferably 2,250 to 3,750 rpm, preferably 2,500 to 3,500 rpm, preferably 2,750 to 3,250 rpm, preferably 3,000 rpm. Preferably, the ball milling decreases the size of the particles by 30-95%, preferably 40-90%, more preferably 60-90% relative to a size of the particles before the ball milling. In some embodiments, the ball milling is performed at 1500 to 5000 rpm and with a ball-to-powder ratio of 50:1 to 5:1 by mass.

In some embodiments, the submicron carbon particles produced by the method have a carbon atomic % of 90 to 99 atom %, preferably 90.25 to 98 atom %, preferably 90.5 to 97 atom %, preferably 90.75 to 96.5 atom %, preferably 91 to 96 atom %, preferably 91.25 to 95.5 atom %, preferably 91.5 to 95 atom %, preferably 91.75 to 94.5 atom %, preferably 92 to 94 atom %, preferably 92.25 to 93.75 atom %, preferably 92.5 to 93.5 atom %, preferably 92.75 to 93.25 atom %, based on a total number of atoms in the submicron carbon particles.

In some embodiments, the submicron carbon particles have a carbon to oxygen ratio of 10:1 to 99:1, preferably 11:1 to 90:1, preferably 12:1 to 80:1, preferably 13:1 to 70:1, preferably 14:1 to 60:1, preferably 15:1 to 50:1, preferably 16:1 to 40:1, preferably 17:1 to 37.5:1, preferably 18:1 to 35:1, preferably 19:1 to 32.5:1, preferably 20:1 to 30:1, preferably 21:1 to 28:1, preferably 22:1 to 27:1, preferably 23:1 to 26:1, preferably 24:1 to 25:1. In some embodiments, the submicron carbon particles has an oxygen atomic % of 1 to 10 atom %, preferably 1.25 to 9 atom %, preferably 1.5 to 8 atom %, preferably 1.75 to 7 atom %, preferably 2 to 6 atom %, preferably 2.25 to 5 atom %, preferably 2.5 to 4 atom %, preferably 2.75 to 3.5 atom %, based on a total number of atoms in the submicron carbon particles.

In some embodiments, the submicron carbon particles have a sulfur atomic % of less than 5 atom %, preferably less than 4.75 atom %, preferably less than 4.5 atom %, preferably less than 4.25 atom %, preferably less than 4.0 atom %, preferably less than 3.75 atom %, preferably less than 3.5 atom %, preferably less than 3.25 atom %, preferably less than 3.0 atom %, preferably less than 2.75 atom %, preferably less than 2.5 atom %, preferably less than 2.25 atom %, based on a total number of atoms in the submicron carbon particles.

In some embodiments, the submicron carbon particles further comprise at least one element selected from the group consisting of vanadium, iron, aluminum, silicon, magnesium, and calcium. In some embodiments, the submicron carbon particles further comprise vanadium. In some embodiments, the submicron carbon particles have a vanadium content of 0.20 to 1 atom %, preferably 0.25 to 0.9 atom %, preferably 0.30 to 0.80 atom %, preferably 0.40 to 0.70 atom %, preferably 0.50 to 0.60 atom %, based on a total number of atoms in the submicron carbon particles. In some embodiments, the submicron carbon particles further comprise magnesium. In some embodiments, the submicron carbon particles have a magnesium content of 0.25 to 1 atom %, preferably 0.275 to 0.9 atom %, preferably 0.3 to 0.75 atom %, preferably 0.325 to 0.7 atom %, preferably 0.35 to 0.60, preferably 0.375 to 0.55, preferably 0.40 to 0.50, preferably 0.425 to 0.475 atom %, based on a total number of atoms in the submicron carbon particles.

In some embodiments, the submicron carbon particles are devoid of functional groups containing carbon-oxygen double bonds as determined by XPS or Raman spectroscopy. In X-ray photoelectron spectroscopy (XPS), signals from the is orbital of $sp^2$-hybridized carbon, like that present in carbon-carbon double bonds (C=C) and carbon-oxygen double bonds (C=O) typically fall in the region of 280 to 290 eV. The presence of carbon-oxygen double bonds typically manifests as a peak in the region 286 to 290 eV, preferably 286.5 to 289 eV, with peak centers at 287 to 288 eV, preferably 287.25 to 287.75 eV. The carbon-carbon double bonds, however, typically show signals in the region 282 to 286 eV, preferably 283.25 to 285.5 eV, with peak centers at 283 to 285 eV, preferably 283.5 to 284.75 eV. In some embodiments, the XPS spectrum of the pyrolyzed oil ash and/or submicron carbon particles is devoid of a signal in the region 286 to 290 eV, preferably 286.25 to 289 eV, preferably 287 to 288 eV. In some embodiments, the submicron carbon particles have an XPS spectrum with a single signal in the region 280 to 292 eV, preferably 280.5 to 289 eV, preferably 281 to 288 eV, preferably 281.5 to 287 eV, preferably 282 to 286 eV, with a maximum intensity at 283.5 to 285.5 eV, preferably 283.75 to 285.25 eV, preferably 284 to 285 eV, preferably 284.25 to 284.75 eV.

In Raman spectroscopy and the closely-related infrared spectroscopy, carbon-oxygen double bonds are identifiable by signals in that typically fall in the region of 1600 to 1900 $cm^{-1}$, preferably 1625 to 1875 $cm^{-1}$, preferably 1650 to 1850 $cm^{-1}$. Examples of functional groups containing carbon-oxygen double bonds include aldehydes, ketones, carboxylic acids, acid chlorides or other acyl halides, esters, carbonate esters, carbamates, amides, enones, acid anhydrides, and imides. The Raman spectrum of carbon materials, such as the pyrolyzed oil ash and submicron carbon particles of the present disclosure, displays a characteristic signal corresponding to an ordered arrangement of material consisting essentially of sheets of $sp^2$-hybridized carbon atoms. The ordering is typically manifested in a regular stacking arrangement of individual sheets. A material exhibiting such an ordered arrangement may be referred to as "graphitic carbon" due to the similar or identical ordered arrangement found in the carbon allotrope graphite. This signal is called the "g band" and typically falls in the region of 1450 to 1650 $cm^{-1}$, preferably 1475 to 1625 $cm^{-1}$, preferably 1500 to 1600 $cm^{-1}$, preferably 1525 to 1590 $cm^{-1}$. In addition to the "g band", the Raman spectrum of carbon materials, such as the pyrolyzed oil ash and submicron carbon particles of the present disclosure, displays a characteristic signal corresponding to a disordered arrangement of material consisting essentially of sheets of $sp^2$-hybridized carbon atoms. This signal is galled the "d band" and typically falls in the region of 1200 to 1400 $cm^{-1}$, preferably 1225 to 1375 $cm^{-1}$, preferably 1250 to 1350 $cm^-$, preferably 1275 to 1325 $cm^{-1}$. One method carbon materials may be characterized is by a measure of the amount of order present in the $sp^2$-hybridized carbon present in the material. Such characterization is especially important for materials such as porous carbon materials, graphite, graphene, graphene oxide, reduced graphene oxide, and the like. Typically this characterization is performed by measuring the intensity of the g band (denoted $I_G$) and the intensity of the d band (denoted $I_D$) and taking the ratio of the intensities. This ratio is typically denoted $I_G/I_D$. In some embodiments, the submicron carbon particles have a Raman spectrum that has a ratio of an intensity at 1520 to 1590 $cm^{-1}$ to an intensity at 1275 to 1325 $cm^{-1}$ of 1:1 to 3:1, preferably 1.25:1 to 2.9:1, preferably 1.5:1 to 2.8:1, preferably 1.75:1 to 2.7:1, preferably 1.9:1 to 2.6:1, preferably 2:1 to 2.5:1, preferably 2.25:1 to 2.4:1, preferably 2.3:1 to 2.39:1.

In some embodiments, the submicron carbon particles have a mean particle size of 100 to 500 nm, preferably 110 to 490 nm, preferably 120 to 475 nm, preferably 130 to 450 nm, preferably 140 to 430 nm, preferably 150 to 420 nm, preferably 160 to 415 nm. In some embodiments, the mean particle size of the submicron carbon particles is dependent upon the duration of the milling of the pyrolyzed oil ash. In some embodiments, the pyrolyzed oil ash is milled for 1 to less than 7.5 hours, preferably 2 to 7 hours, preferably 2.5 to 6.5 hours, preferably 3 to 6 hours, preferably 3.5 to 5.75 hours, preferably 4 to 5.5 hours, preferably 4.5 to 5.25 hours, preferably 5 hours and the submicron carbon particles have a mean particle size of greater than 350 to 500 nm, preferably 375 to 475 nm, preferably 390 to 450 nm, preferably 400 to 425 nm, preferably 410 to 420 nm, preferably 415 nm.

In some embodiments, the pyrolyzed oil ash is milled for greater than 7.5 to less than 12.5 hours, preferably 8 to 12 hours, preferably 8.5 to 11.5 hours, preferably 9 to 11 hours, preferably 9.25 to 10.75 hours, preferably 9.5 to 10.5 hours, preferably 9.75 to 10.25 hours, preferably 10 hours and the submicron carbon particles have a mean particle size of greater than 200 to less than 350 nm, preferably 210 to 340 nm, preferably 220 to 330 nm, preferably 230 to 320 nm, preferably 240 to 310 nm, preferably 250 to 300 nm, preferably 260 to 290 nm, preferably 265 to 285 nm, preferably 280 to 280 nm.

In some embodiments, the pyrolyzed oil ash is milled for greater than 12.5 to 24 hours, preferably 13 to 22 hours, preferably 13.5 to 20 hours, preferably 14 to 18 hours, preferably 14.25 to 17 hours, preferably 14.5 to 16 hours, preferably 14.75 to 15.5 hours, preferably 15 hours and the submicron carbon particles have a mean particle size of 100 to less than 200 nm, preferably 110 to 190 nm, preferably 120 to 180 nm, preferably 130 to 175 nm, preferably 140 to 170 nm, preferably 150 to 167.5 nm, preferably 160 to 165 nm.

In some embodiments, the submicron carbon particles may have a spherical shape, or may be shaped like cylinders, boxes, blocks, spikes, flakes, plates, ellipsoids, toroids, stars, ribbons, discs, rods, granules, prisms, cones, platelets, sheets, angular chunks, terraced cubes, terraced rectangular prisms, or some other shape. In some embodiments, the submicron carbon particles may be substantially spherical, meaning that the distance from the particle centroid (center of mass) to anywhere on the particle outer surface varies by less than 30%, preferably by less than 20%, more preferably by less than 10% of the average distance. In some embodiments, the submicron carbon particles are in the form of blocks, granules, terraced rectangular prisms, or angular chunks, having a mean size in a range as previously described and having a largest dimension that is 50 to 500%, preferably 75 to 400, preferably 100 to 350%, preferably 150 to 250% of the range previously described and a smallest dimension that is 5 to 150, preferably 10 to 125, preferably 15 to 100, preferably 25 to 75% of the range previously described. In some embodiments, the submicron carbon particles may be in the form of agglomerates. As used herein, the term "agglomerates" refers to a clustered particulate composition comprising primary particles, the primary particles being aggregated together in such a way so as to form clusters thereof, at least 50 volume percent of the clusters having a mean size that is at least 2 times the mean size of the primary particles, and preferably at least 90 volume percent of the clusters having a mean size that is at least 5 times the mean diameter of the primary particles. The primary particles may be the submicron carbon particles having a mean size as previously described. In some embodiments, the submicron carbon particles are monodisperse, having a coefficient of variation or relative standard deviation, expressed as a percentage and defined as the ratio of the particle size standard deviation ($\sigma$) to the particle size mean ($\mu$), multiplied by 100%, of less than 25%, preferably less than 10%, preferably less than 8%, preferably less than 6%, preferably less than 5%. In a preferred embodiment, the submicron carbon particles are monodisperse, having a particle size distribution ranging from 80% of the mean particle size to 120% of the average particle size, preferably 85 to 115%, preferably 90 to 110% of the mean particle size. In another embodiment, the submicron carbon particles are not monodisperse.

The examples below are intended to further illustrate protocols for the preparation of submicron carbon particles by the method described above and are not intended to limit the scope of the claims.

Example 1

Materials and Preparation

The oil ash used in this study was obtained from Shuaibah SEC power plant, Saudi electricity company Jeddah, Saudi Arabia. Initially, carbonization of the as received oil ash was performed by the pyrolysis at 800° C. for 3 hours in a tubular furnace under nitrogen atmosphere. The heating and cooling rate were 10°/min and 5°/min, respectively. After the pyrolysis, the quantity of the obtained carbon was about 60% of initial oil ash weight. The carbon obtained by pyrolysis was then ball milled in high energy ball milling machine at a speed of 3000 rpm and was checked at intervals of 5 hrs, 10 hrs, and 15 hrs using FE-SEM to achieve a fine submicron particle size. The diameter of the balls used and ratio of pyrolyzed oil ash to zirconium balls (mass to mass) were 600 µm and 1:20, respectively for ball milling.

Instrumentation

The scanning electron microscopic images and elemental analysis were observed using a Field emission scanning electron microscope (FE-SEM) (Tescan Lyra-3) at the Center of Research Excellence in Nanotechnology (CENT) labs. KFUPM. This FE-SEM was operated at 20 kV. The EDS analysis of our samples was carried out on a Lyra 3 attachment to the FE-SEM using LINK INCA program system. The XRD patterns of our samples were recorded using a MiniFlex II desktop X-ray diffractometer equipped with Cu $K\alpha_1$ radiation ($\lambda$=1.54056 Å), installed at CENT, KFUPM. The Raman spectroscopy (iHR320 imaging Spectrometer packaged with CCD detector, HORIBA) equipped with a 300 mW green laser was used to record the Raman spectra of our samples with an excitation wavelength at room temperature. A micro-focusing X-ray monochromator XPS (ESCALAB 250Xi XPS Microprobe, Thermo Scientific, USA) installed in the department of Physics, KFUPM, was applied for the XPS analysis.

Example 2

Figure 1B:
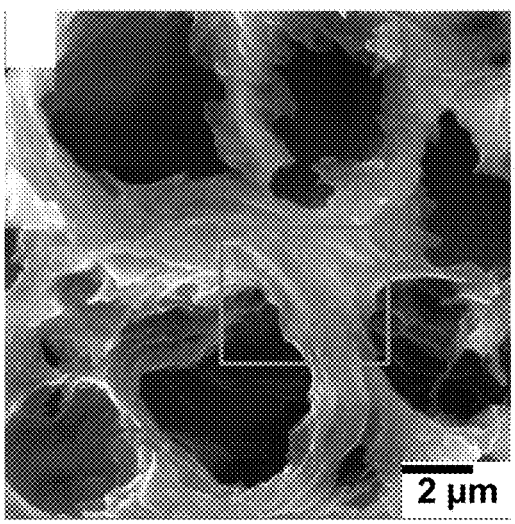
Figure 1C:
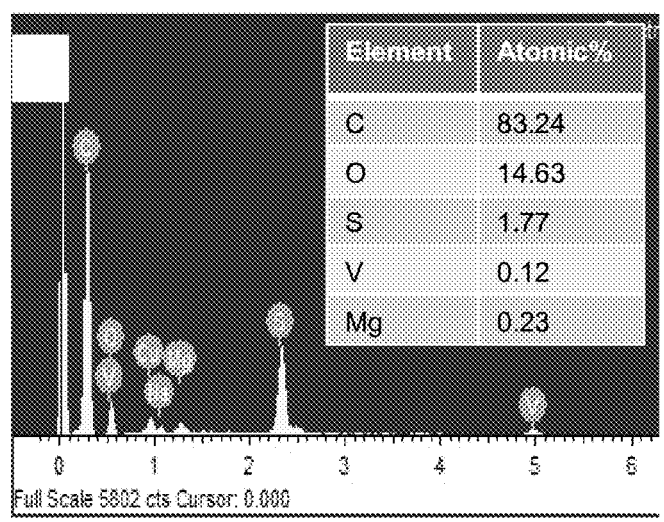
Figure 1D:
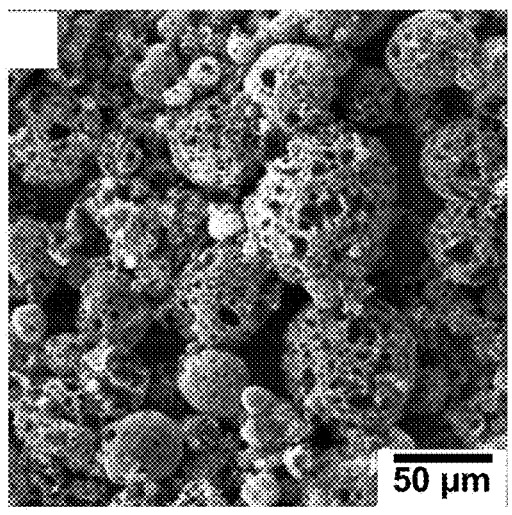
Figure 1E:
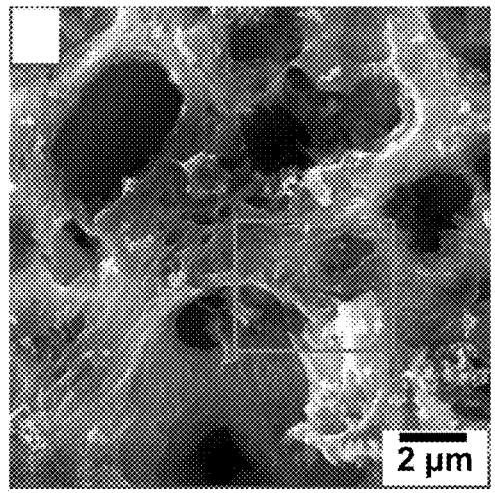
Figure 1F:
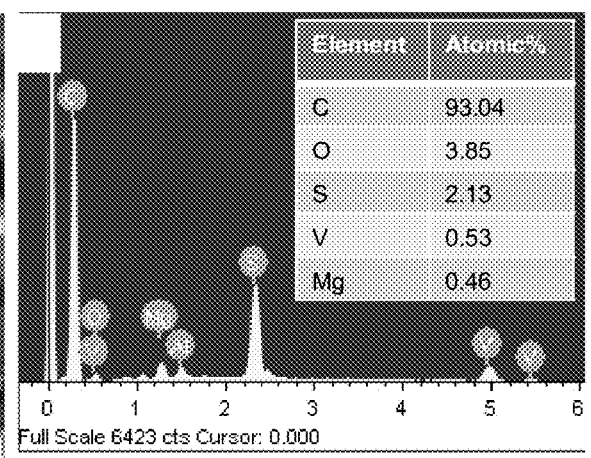
Figure 2A:
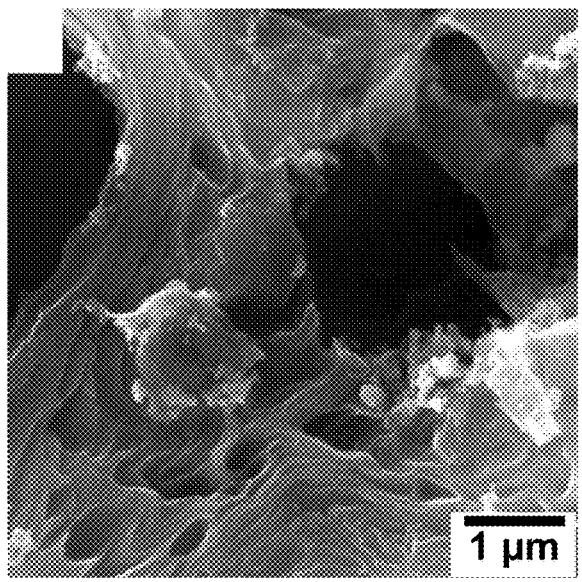
Figure 2B:
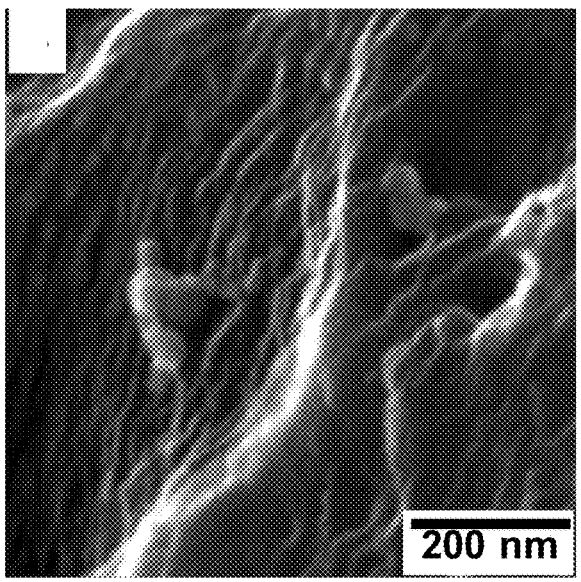

The morphology of as received raw oil ash at two different magnifications is shown in FIG. 1A-1B. FIG. 1A clearly indicates that the structure of oil ash is spherical ball type of different sizes. A typical measurement of the ball size from the FE-SEM image indicates a wide range of size variations as mentioned, 7%>50 µm, 15% in the range of 50-40 µm, 7%-40-30 µm, 26%-30-20 µm, 34%-20-10 µm and 11%-<10 µm. FIG. 1B clearly shows that the oil ash is highly porous in nature with an average pore size of 3-5 µm, which is known as macro-pores/voids. FIG. 1C shows the elemental analysis spectrum (EDS) of the oil ash, obtained at the indicated position. It indicates that the presence of carbon and oxygen is high, minor quantities of sulphur, vanadium and magnesium were also traced, while the copper/aluminum were observed as the used substrate for the preparation of FESEM-EDS sample was a copper/aluminum tape. FIG. 1D-1E show the structure of pyrolyzed oil ash. This FE-SEM image indicates that the heat treatment of the oil ash at 800° C. did not change its original morphology i.e. remain spherical structure and highly porous in nature. A typical measurement of the sphere size from the FE-SEM image indicates the size variation of the ball fall in as 8.6%>50 µm, 20% in the range of 50-40 µm, 11%-40-30 µm, 14.3%-30-20 µm, 29%-20-10 µm and 17%-<10 µm. FIG. 1F shows the EDS spectrum of the pyrolyzed oil ash. It shows that the elemental composition is same except the carbon and oxygen percentage. The percentage of carbon has increased while the oxygen content has decreased. FIG. 2A-2B are the high magnification images of the pyrolyzed oil ash, it shows that the carbon obtained has a layered structure.

Figure 3A:
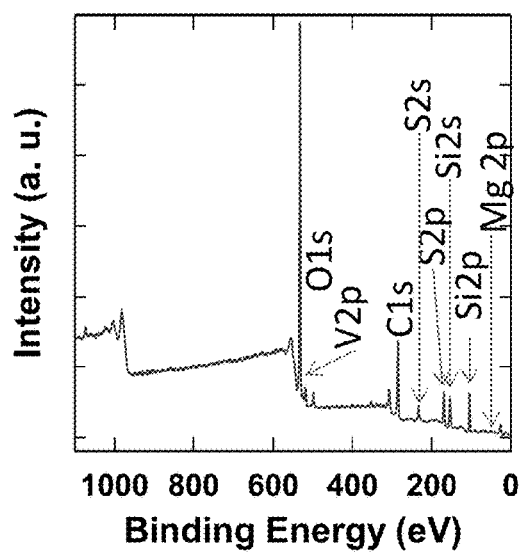
Figure 3B:
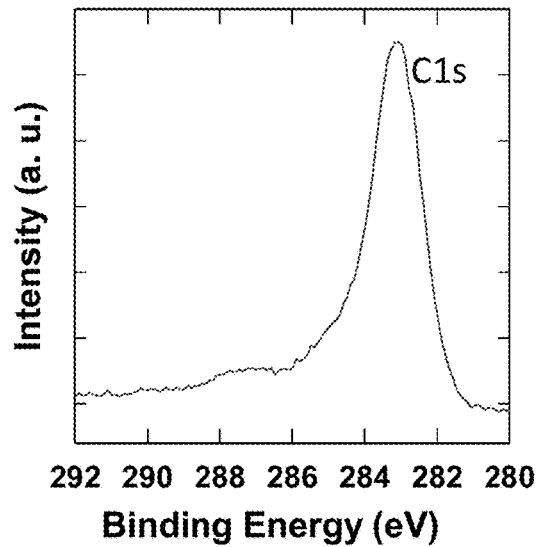
Figure 3C:
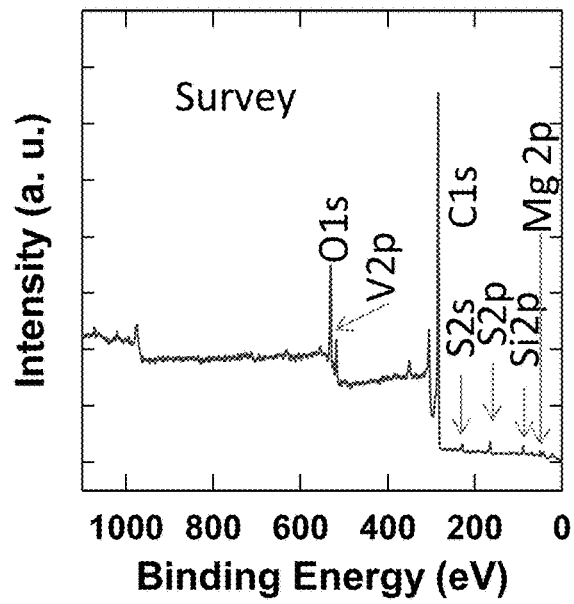
Figure 3D:
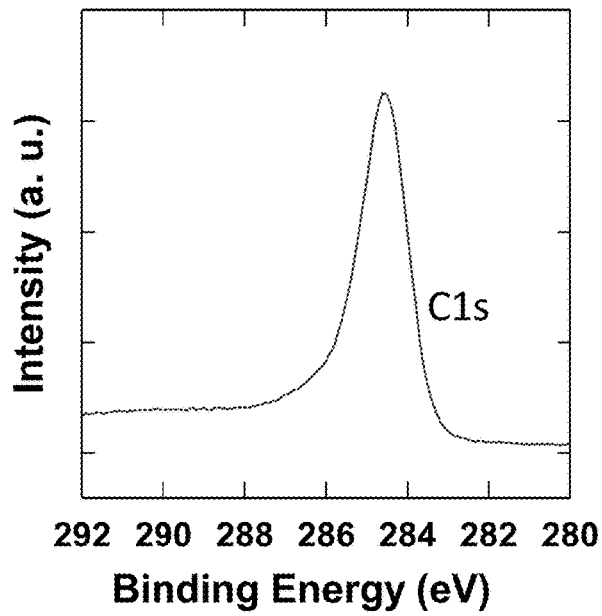

To know more details about the chemical composition of oil ash and pyrolyzed oil ash, the XPS spectra of both were recorded. The peaks in both survey spectra were obtained for C, S, O, V and Mg as indicated in the figures (FIGS. 3A and 3C) i.e. both sample have these elements. Besides, these peaks one additional peak for Si appeared in both samples, which corresponds to the substrate glass as glass substrates were used for preparing the XPS samples. Besides, XPS peak of O might be for glass also. To confirm the information about the oxygen in the oil ash and pyrolyzed oil ash, the C1s spectra of both samples was recorded (FIGS. 3B and 3D). This analysis indicates that the XPS spectrum of oil ash (FIG. 3B) has peaks for $sp^2$-hybridized carbon (peak at 284.6 eV) as well as C—O or —COO— peaks (broad peak between 286.0 to 288.5 eV) [M. A. Aziz, and H. Yang, Chemical Communications, (2008) 826-828]. Whereas, the carbon obtained by pyrolysis of oil ash at 800° C. (FIG. 3D) showed only one peak for $sp^2$ hybridized carbon i.e. the oxygen from oxygen containing functional group of the oil ash have been disappeared after carbonization at 800° C. It is noted that $sp^2$ hybridized carbon is responsible for the conductivity of carbon.

Figure 4A:
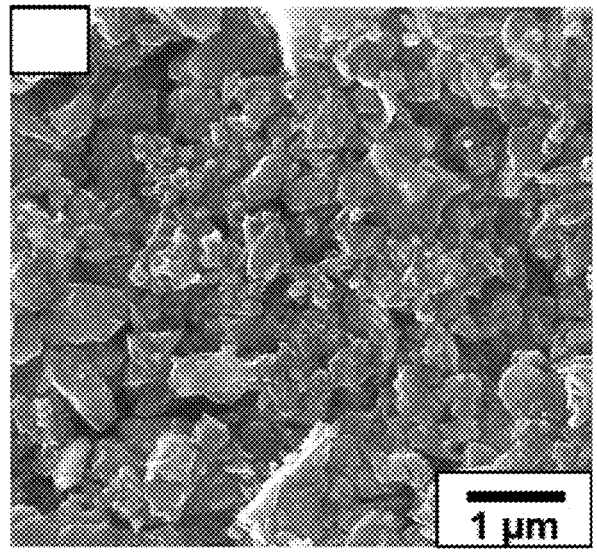
Figure 4B:
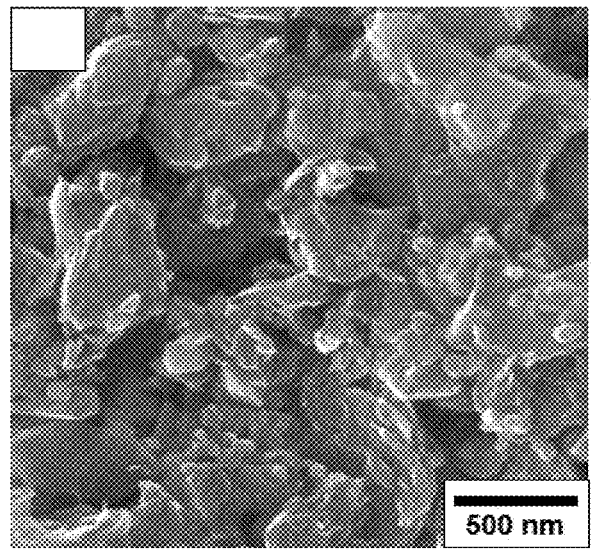
Figure 4C:
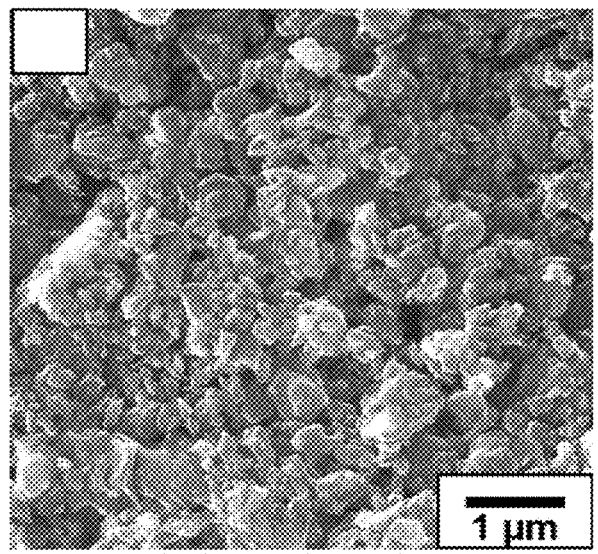
Figure 4D:
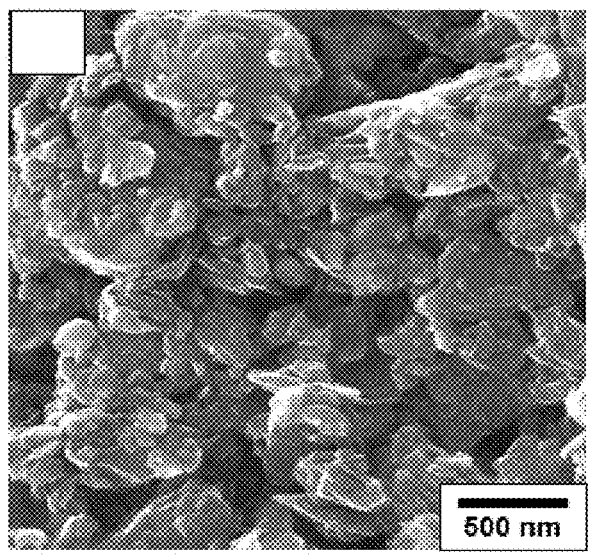
Figure 4E:
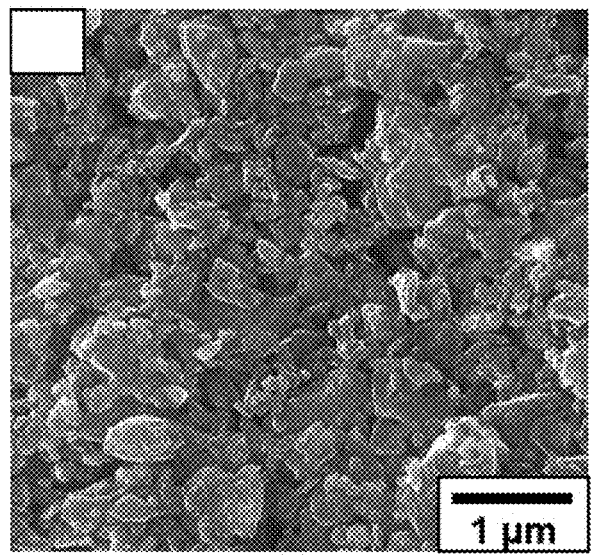
Figure 4F:
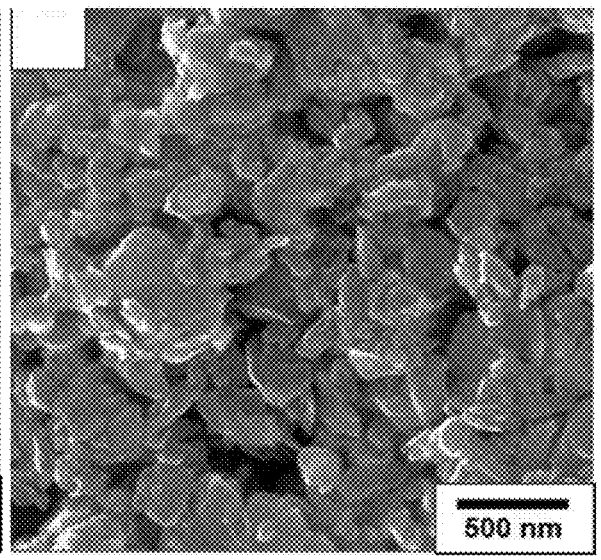

Since the nano/sub-micron or micron size particles are more preferred than the macro size particles in various scientific, engineering and industrial applications, the pyrolyzed oil ash was subjected to ball milling in order to reduce its size from micro to submicron. The purpose of selecting ball milling for making the bigger sizes spherical carbon into a fine powder is, because it's a direct, simple and cost effective process (top-down method) which can yield a large amount of material in a batch. The ball milling was operated at a speed of 3000 rpm and monitored in three intervals of time, i.e 5 hrs, 10 hrs, and 15 hrs. The size of the grinded carbon particles was measured at each of these intervals using FE-SEM. FIG. 4A-4F depict the FE-SEM images of carbon during the ball milling process at two different magnification scales. FIG. 4A-4C shows the FE-SEM images recorded at 1 µm size scale bar of three carbon particles prepared at different intervals of ball milling, 5 hrs (FIG. 4A), 10 hrs (FIG. 4B), and 15 hrs (FIG. 4C), respectively. Additionally, FIG. 4D-4F shows the FE-SEM images recorded at 500 nm size scale bar of three carbon particles prepared at different intervals of ball milling, 5 hrs (FIG. 4D), 10 hrs (FIG. 4E), and 15 hrs (FIG. 4F), respectively. FIG. 4A-4F shows that the average particle sizes of the carbon obtained at 5, 10, and 15 hrs ball milling are 415, 278, and 162 nm, respectively.

Figure 5:
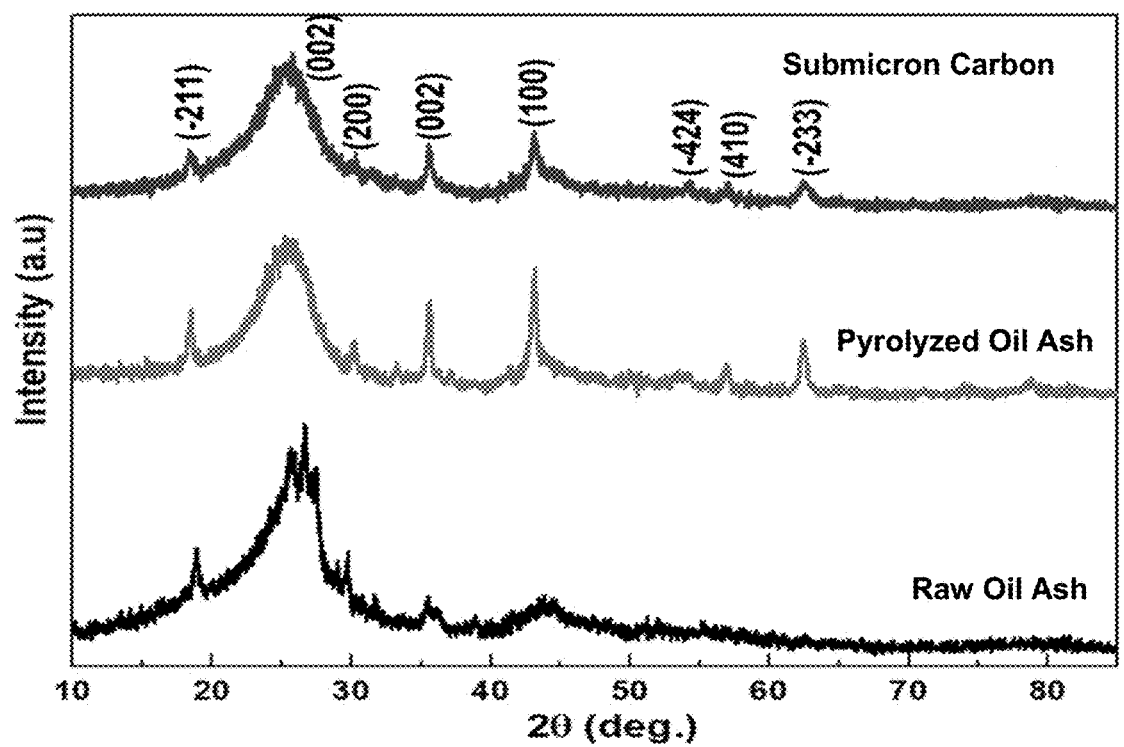
FIG. 5 is the PXRD pattern for the oil ash, pyrolyzed oil ash, and submicron carbon particles.

FIG. 5A shows the XRD pattern of oil ash. The presence of a broad diffraction peak in the $2\theta$ range of 22 to 28° can be attributed to the typical graphitic carbon structure (002) plane, however, the occurrence of sharp peak at $2\theta$ values of ~26° and ~43° corresponds to the (002) and (100) planes of carbon nanotubes (C) (JSCPDS card No. 00-058-1638). The peak at 19.6° corresponds to the (−211) plane of delta S (sulfur) (JSCPDS card No. 01-072-1001), whereas the peak at 29.5° corresponds to the (200) plane of sulfur oxide ($SO_2$) (JSCPDS card No. 00-005-0428). FIG. 5B is the XRD pattern of pyrolyzed oil ash, while the FIG. 5C is the XRD pattern of the submicron carbon developed by ball milling of pyrolyzed oil ash for 15 hours. It is noticed that the XRD peaks found in oil ash exist in the pyrolyzed oil ash, and submicron carbon developed by ball milling of the pyrolyzed oil ash i.e. these three sample possess same crystal plane of carbon and sulfur. It is also observed that the peaks in FIGS. 5B and 5C have similar peaks with a slight difference in their intensities. The occurrence of extra peaks in FIGS. 5B and 5C at $2\theta$ values of 53°, 57°, and 62° corresponds to the (−424), (410), and (−233) planes of vanadium oxide ($V_3O_5$) (JSCPDS card No. 01-071-0039). However, the peaks at 43°, 62°, 74°, and 78° $2\theta$ correspond to (200), (220), (311), and (222) planes of MgO (JSCPDS card No. 00-045-0946). These result indicated that the vanadium oxide and MgO became crystalline upon heat treatment.

Figure 6A:
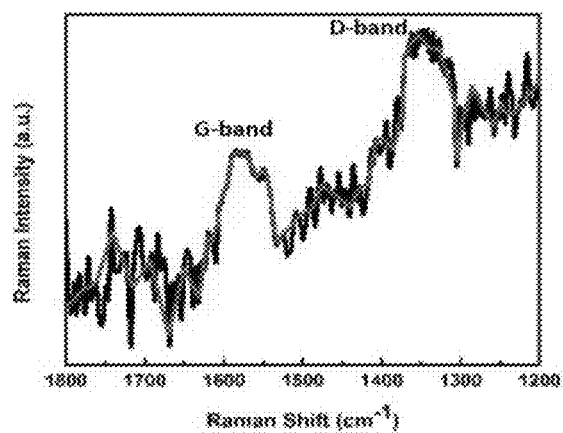
Figure 6B:
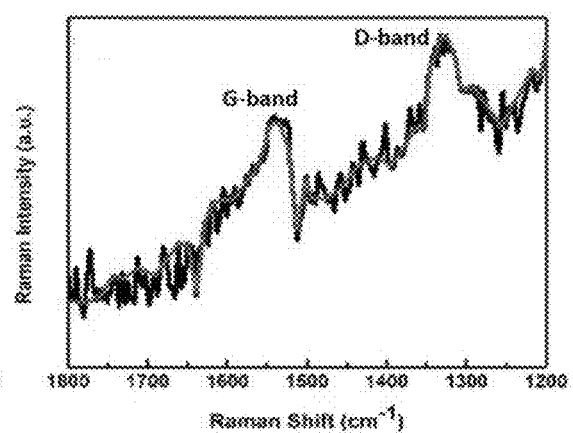
Figure 6C:
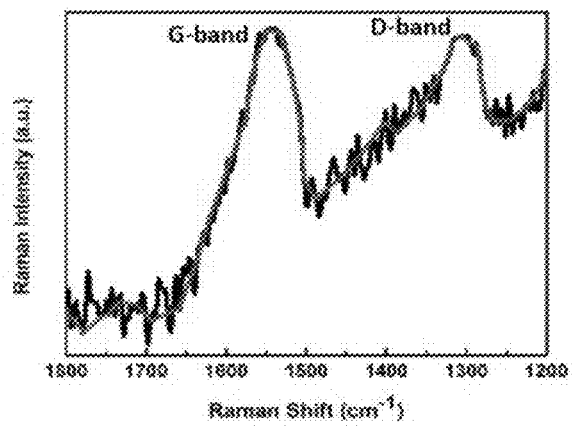

FIG. 6A-6C present the Raman spectra of oil ash (FIG. 6A), pyrolyzed oil ash (FIG. 6B), and submicron carbon obtained after 15 hours ball milling of pyrolyzed oil ash (FIG. 6C). Each spectrum is composed of two peaks called G band and D bands as indicated in FIG. 6A-6C. These bands appear from the sp² hybridized carbon structure and are related to graphitic carbon. The obtained $I_G/I_D$ ($I_D$ signifies the intensity of the D band and $I_G$ denotes the intensity of the G band) were 0.9, 1.1 and 2.375 for oil ash, pyrolyzed oil ash and submicron carbon obtained after 15 hours ball milling of pyrolyzed oil ash. This lowest intensity ratio indicated the presence of a significant amount of disordered carbon in the oil ash. After pyrolysis of oil ash, the intensity ratio increased i.e. increase in the amount of ordered carbon (graphitic carbon). The highest intensity ratio indicates the presence of significant amount of ordered carbon in submicro-structured carbon. Overall, the presence of ordered carbon followed the sequence as: submicro-structured carbon>carbon prepared at 800° C. from oil ash>oil ash.

The invention claimed is:

1. A method for producing submicron carbon particles, comprising:
   pyrolyzing oil ash at 600 to 1000° C. for 1 to 6 hours to produce a pyrolyzed oil ash, and
   milling the pyrolyzed oil ash for 1 to 24 hours to produce the submicron carbon particles,
   wherein the submicron carbon particles have a ratio of carbon to oxygen of 10:1 to 99:1, and
   wherein the submicron carbon particles are devoid of functional groups containing carbon-oxygen double bonds as determined by XPS or Raman spectroscopy.

2. The method of claim 1, wherein the oil ash comprises carbon, oxygen, and sulfur.

3. The method of claim 2, wherein the oil ash has a carbon to oxygen ratio of 3:1 to 15:1.

4. The method of claim 2, wherein the oil ash further comprises at least one element selected from the group consisting of vanadium, iron, aluminum, silicon, magnesium, and calcium.

5. The method of claim 1, wherein the oil ash has a carbon atomic % of 65 to 89 atom %, based on a total number of atoms in the oil ash.

6. The method of claim 1, wherein the oil ash has a sulfur atomic % of less than 2 atom %, based on a total number of atoms in the oil ash.

7. The method of claim 1, wherein the oil ash is a heavy oil ash.

8. The method of claim 1, wherein the pyrolyzing is performed with a heating rate of 1° C./min to 15° C./min and a cooling rate of 1° C./min to 15° C./min.

9. The method of claim 1, wherein the pyrolyzing is performed in an inert atmosphere.

10. The method of claim 1, wherein the milling is ball milling.

11. The method of claim 10, wherein the ball milling is performed at 1500 to 5000 rpm and with a ball-to-powder ratio of 50:1 to 5:1 by mass.

12. The method of claim 1, wherein the submicron carbon particles have a carbon atomic % of 90 to 99 atom % based on a total number of atoms in the submicron carbon particles.

13. The method of claim 1, wherein the submicron carbon particles have a sulfur atomic % of less than 5 atom % based on a total number of atoms in the submicron carbon particles.

14. The method of claim 1, wherein the submicron carbon particles further comprise at least one element selected from the group consisting of vanadium, iron, aluminum, silicon, magnesium, and calcium.

15. The method of claim 1, wherein the submicron carbon particles have a mean particle size of 100 to 500 nm.

16. The method of claim 1, wherein the pyrolyzed oil ash is milled for 1 to less than 7.5 hours and the submicron carbon particles have a mean particle size of greater than 350 to 500 nm.

17. The method of claim 1, wherein the pyrolyzed oil ash is milled for greater than 7.5 to less than 12.5 hours and the submicron carbon particles have a mean particle size of greater than 200 to less than 350 nm.

18. The method of claim 1, wherein the pyrolyzed oil ash is milled for greater than 12.5 to 24 hours and the submicron carbon particles have a mean particle size of 100 to less than 200 nm.

19. The method of claim 1, wherein the submicron carbon particles have a Raman spectrum that has a ratio of an intensity at 1520 to 1590 cm$^{-1}$ to an intensity at 1275 to 1325 cm$^{-1}$ of 1:1 to 3:1.

20. The method of claim 1, wherein the submicron carbon particles have an XPS spectrum with a single signal in the region 280 to 292 eV with a maximum intensity at 283.5 to 285.5 eV.

* * * * *